United States Patent
Despesse (10) Patent No.: US 8,710,793 B2
(45) Date of Patent: Apr. 29, 2014

(54) ELECTRICAL CONVERTER WITH VARIABLE CAPACITOR

(75) Inventor: Ghislain Despesse, Saint Egreve (FR)

(73) Assignee: Commissariat à l' énergie atomique et aux energies alternatives, Paris (FR)

( * ) Notice: Subject to any disclaimer, the term of this patent is extended or adjusted under 35 U.S.C. 154(b) by 282 days.

(21) Appl. No.: 12/747,676

(22) PCT Filed: Dec. 22, 2008

(86) PCT No.: PCT/EP2008/068179
§ 371 (c)(1),
(2), (4) Date: Jun. 11, 2010

(87) PCT Pub. No.: WO2009/083541
PCT Pub. Date: Jul. 9, 2009

(65) Prior Publication Data
US 2010/0264870 A1  Oct. 21, 2010

(30) Foreign Application Priority Data
Dec. 20, 2007  (FR) ...................................... 07 60087

(51) Int. Cl.
*H02J 7/00*  (2006.01)
(52) U.S. Cl.
USPC ........................................ 320/103; 320/166
(58) Field of Classification Search
USPC ................................. 320/103, 166
See application file for complete search history.

(56) References Cited

U.S. PATENT DOCUMENTS

| | | | | |
|---|---|---|---|---|
| 6,058,027 A | * | 5/2000 | Vargha et al. | 363/33 |
| 6,127,812 A | * | 10/2000 | Ghezzo et al. | 320/166 |
| 6,317,342 B1 | * | 11/2001 | Noworolski et al. | 363/59 |
| 7,615,970 B1 | * | 11/2009 | Gimlan | 320/166 |
| 2003/0016111 A1 | * | 1/2003 | Zverev et al. | 336/182 |
| 2004/0227493 A1 | * | 11/2004 | Van Brocklin et al. | 320/166 |
| 2006/0267558 A1 | * | 11/2006 | Petz et al. | 320/166 |

OTHER PUBLICATIONS

J. Mark Noworolski, Seth R. Sanders, "An Electrostatic Microresonant Power Conversion Device", 1992, IEEE.*
L. Li, M. Begbie, D. Uttamchandani, "Single-input, dual-output MEMS DC/DC converter", Jul. 2007, IEEE.*

(Continued)

*Primary Examiner* — Drew A Dunn
*Assistant Examiner* — Nathaniel Pelton
(74) *Attorney, Agent, or Firm* — Oblon, Spivak, McClelland, Maier & Neustadt, L.L.P.

(57) ABSTRACT

A system for converting energy at a first voltage to a second voltage, including at least one source of voltage, a discharge switch, a variable capacitor, and a collection mechanism, connected in parallel, a charge switch between the discharge switch and the source, a transfer switch between the variable capacitor and the collection mechanism, and a controller to execute a control such that: a) during a first operation, the charge switch is closed to charge the variable capacitor, while the discharge switch and the transfer switch remain open; b) during a subsequent operation, the discharge switch is closed for a short instant while the charge switch remains open, allowing at least partial discharge of the variable capacitor.

19 Claims, 6 Drawing Sheets

(56) References Cited

OTHER PUBLICATIONS

French Search Report issued Aug. 20, 2008 in FR Application No. 076008700, filed Dec. 20, 2007.
International Search Report issued Apr. 4, 2009 in PCT/EP2008/068179.
L. Li, et al., "Single-input, dual-output MEMS DC/DC converter", Electronics Letters, vol. 43, No. 15, XP006029380, Jul. 19, 2007, pp. 809-810.
J. Mark Noworolski, et al., "An Electrostatic Microresonant Power Conversion Device", IEEE Proceedings of the Annual Power Electronics Specialists Conference (PESC), XP010064810, Jun. 29, 1992, pp. 997-1002.
Bernard C. Yen, et al., "A Variable-Capacitance Vibration-to-Electric Energy Harvester", IEEE Transactions on Circuits and Systems-I: Fundamental Theory and Applications, 2005, pp. 1-8.
U.S. Appl. No. 13/120,805, filed Jun. 10, 2011, Despesse.

* cited by examiner

ELECTRICAL CONVERTER WITH VARIABLE CAPACITOR

TECHNICAL FIELD AND PRIOR ART

This invention relates to a compact electrical converter designed to convert electrical energy supplied by a source at a first potential into electrical energy at a different potential that can be used by an electrical system.

In general, electrical energy supplied by a power supply is for example at a voltage of 220 V, and many appliances, particularly portable appliances, require a lower operating voltage, for example 12V or 14V. Therefore, this requires the use of an electrical energy converter, also called an electrical transformer, and this system is usually of the inductive type.

An electrical converter operates based on the following principle: electrical energy from an arbitrary source at a given potential or a given current is stored in another form and is then restored in electrical form at a required potential or current.

Electrical energy is stored in electrical/electrical conversion structures in magnetic form (inductance, transformer) in a known manner. However, these conversion structures based on electromagnetic elements must be sufficiently large to be able to provide good electrical performances. If the dimensions of an inductance type electromagnetic system are reduced, resistive losses due to the winding become very large relative to the energy that can be stored in the magnetic element; therefore, the efficiency becomes very low which makes their use not very attractive in very small systems, for example in systems integrated on silicon, unless extremely low efficiencies are accepted.

Furthermore, these structures require a current circulation which also leads to energy dissipation and a temperature rise in small wires.

Document U.S. Pat. No. 6,317,342 describes a voltage converter using a variable capacitor. This converter generates high energy losses. It also necessarily operates at resonance, so that an external clock is necessary to make the charge transfer.

Consequently, one of the purposes of this invention is to provide a compact electrical energy conversion system with good performances.

PRESENTATION OF THE INVENTION

The above-mentioned purpose is achieved by a system in which energy is stored in mechanical form using an electrostatic structure using at least one capacitor with a variable air gap, electrostatic forces appearing between the armatures of the capacitor to make the conversion. An operating step at constant charge reduces system losses so that its performance is better than is possible with systems according to prior art.

Therefore, the conversion involves a mechanical movement only created by electrostatic forces.

Storage takes place in the form of mechanical energy, for example kinetic and/or potential energy, the potential energy possibly being mechanical deformation energy such as the compression of a spring or bending of a beam.

The system according to the invention may comprise at least one variable capacitor provided with a mobile armature, the capacitor is capable of converting electrical energy at a given voltage into mechanical energy by displacing the mobile armature, for example by deforming a spring, therefore mechanical energy is stored in the spring and this mechanical energy is then converted into electrical energy at another voltage by a new displacement of the mobile armature. The electrostatic structure is then used sequentially in actuator mode and in electrical energy converter mode.

In another embodiment, the system may comprise two capacitors, one with the main function of displacing the mobile armature and the other more particularly with the main function of modifying the voltage.

The system according to the invention can operate in voltage step down or step up.

According to the invention, very compact converters are possible. Unlike the case for electromagnetic conversion, with electrostatic conversion, the capacitance per unit volume of structures increases as the dimensions are reduced, therefore the convertible energy per unit volume is high. The surface area increases, the structure of the material is better and air gaps are reduced.

Moreover in an electrostatic system, mechanical forces are created by electrical voltages/fields to store energy rather than electrical currents, consequently there is no energy dissipation due to the circulation of a current in wires with small cross-section, and no temperature rise.

Furthermore, monocrystalline materials such as silicon can be used in the case of very small systems and the mechanical damping of the conversion system is then very low and mechanical quality factors are very high, with the result that extremely low mechanical losses are achieved.

It then becomes possible to make very small integrated systems adapted to use in portable electronic devices.

It would be possible to couple several systems to make a conversion into electrical energy at several voltage values.

One particularly advantageous conversion system operates in two distinct modes:
a first mode in which the potential of electrical charges changes gradually, without any current circulating,
a second mode in which electrical charges circulate without any potential difference.

Operation of the system in these two modes consecutively can result in no losses in the charge transfer. The power dissipated in the conversion system is equal to the product of the current and the voltage difference, and is always zero in both of these two modes because one of the components in each mode is always zero. The system according to the invention then achieves low energy losses during the conversion.

There are also so-called "switched capacitance" systems, for which the operating principle consists of transferring energy by means of at least two capacitors with a fixed mechanical structure, by switching their connection into parallel and into series successively.

However, energy is only transferred if there is a voltage difference between the source and the capacitors just before their connection to the source. Consequently, an energy loss by dissipation occurs when the switch is closed due to the voltage difference.

The main subject-matter of the present invention is then a method for converting a first electrical energy at a first voltage into a second electrical energy at a second voltage by a conversion system comprising at least one voltage source at the first voltage connected to a variable capacitor through a charge switch, a discharge switch being placed in parallel with the variable capacitor, a means of collecting energy at the second voltage, and means of transferring energy between the variable capacitor and the collection means, the variable capacitor comprising a fixed plate and a mobile plate capable of moving away from and towards the fixed plate and elastic means to return the mobile plate to its initial position, the method comprising the following steps for one complete conversion cycle:

a) close the charge switch while the discharge switch remains open, to charge the variable capacitor at the first voltage and induce a displacement of the mobile plate increasing the capacitance of the capacitor;

b) open the charge switch while keeping the discharge switch open to allow operation of the capacitor at constant charge, the capacitance of the capacitor continuing to increase;

c) close the discharge switch to allow at least partial discharge of the variable capacitor and to invert the movement of the mobile element;

the transfer means providing energy transfer from the capacitor to the collection means during movement of the mobile electrode.

Another subject-matter of the present invention is a conversion system from a first electrical energy at a first voltage to a second electrical energy at a second voltage comprising at least one voltage source at the first voltage connected to a variable capacitor through a charge switch, a discharge switch being placed in parallel with the variable capacitor, an energy collection means at the second voltage, and means of transferring energy (between the variable capacitor and the collection means), the variable capacitor comprising a fixed plate, a mobile plate capable of moving away from and towards the fixed plate and elastic means to return the mobile plate to its initial position, said conversion system also comprising means of controlling the charge and discharge switches such that for a conversion cycle:

a) during a first step, the discharge switch is opened and the charge switch is closed to charge the capacitor at the first voltage and the mobile plate is displaced increasing the capacitance of the capacitor;

b) during a second step, the charge switch is open and the discharge switch is kept open to allow operation of the capacitor at constant charge, the capacitance of the capacitor continuing to increase;

c) during a third step, the discharge switch is closed allowing at least partial discharge of the variable capacitor leading to an inversion of the movement of the mobile element;

the transfer means transferring energy from the capacitor to the collection means during movement of the mobile electrode.

Advantageously, the switches are controlled such that the charge switch is closed when the capacitance of the capacitor is minimum.

The switches are advantageously controlled such that the discharge switch is closed when the capacitance of the capacitor is maximum.

For example, one of the electrodes of the capacitor may be connected to the collection means through a transfer switch or diode. The transfer switch or diode may for example be made conducting during a movement phase of the mobile electrode of the variable capacitor corresponding to a reduction in its capacitance.

In one embodiment, the variable capacitor forms a first capacitor, the system also comprising a second variable capacitor comprising at least a fixed plate and a mobile plate capable of moving away from and separating from the fixed plate, the mobile plates in the first and second capacitors being fixed in movement, the second variable capacitor being connected to the collection means though a transfer switch or diode. The second capacitor advantageously comprises two fixed plates arranged on each side of the mobile plate.

In another embodiment, each capacitor comprises a fixed plate and each is arranged on one side of a common mobile plate.

Advantageously, the first fixed plate of the first capacitor provides a surface facing the mobile plate above the surface of the second fixed plate of the second capacitor.

The discharge switch closing duration is advantageously less than one hundredth of the duration of the conversion cycle.

For example, the discharge switch is formed of elements supported on the fixed plate and the mobile plate of said variable capacitor, the discharge taking place by bringing elements supported on the plates into contact with each other.

Switches could be controllable as a function of time, or the value of the position of a mobile plate, or the capacitance of one of the capacitors, the voltage at the terminals of a capacitor or the derivative of the voltage at the terminals of a capacitor.

The system may be an integrated system made of silicon.

The return means may for example be chosen from springs, blades and deformable beams.

Another subject-matter of the present invention is an electrical energy conversion assembly comprising at least two conversion systems according to this invention, said assembly being capable of converting the first energy at the first voltage into several second energies at several second voltages; the systems may have a common mobile electrode.

Another subject-matter of the present invention is an electronic device comprising at least one electrical energy conversion system according to this invention or a conversion assembly according to this invention.

BRIEF DESCRIPTION OF THE DRAWINGS

This invention will be better understood after reading the following description and the appended drawings in which.

DETAILED PRESENTATION OF PARTICULAR EMBODIMENTS

In the remaining description, the systems are described such that they operate in different modes; a constant voltage mode and a constant charge mode. However, it would be possible for these two modes to overlap, i.e. the voltage can vary at the same time as the charge and vice versa, depending on how the switches are controlled.

Figure 3:
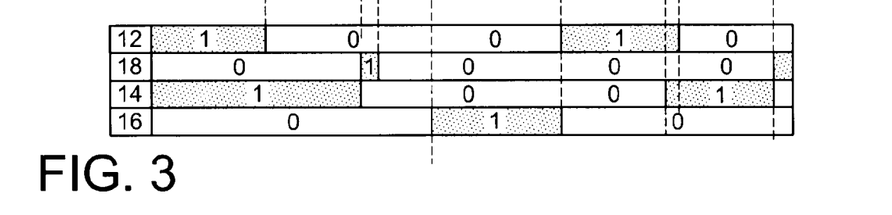
FIG. 3 is a chronogram indicating the different states of the switches in FIG. 1.
Figure 6:
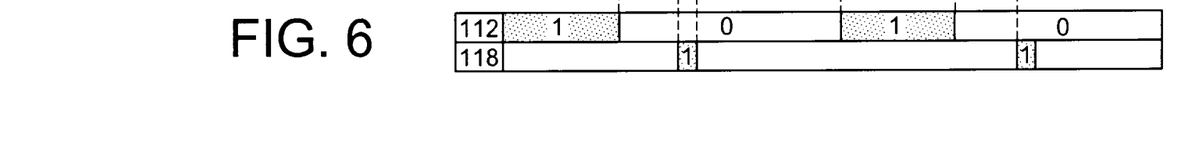
FIG. 6 is a chronogram indicating the different states of the switches in FIG. 4.
Figure 7:
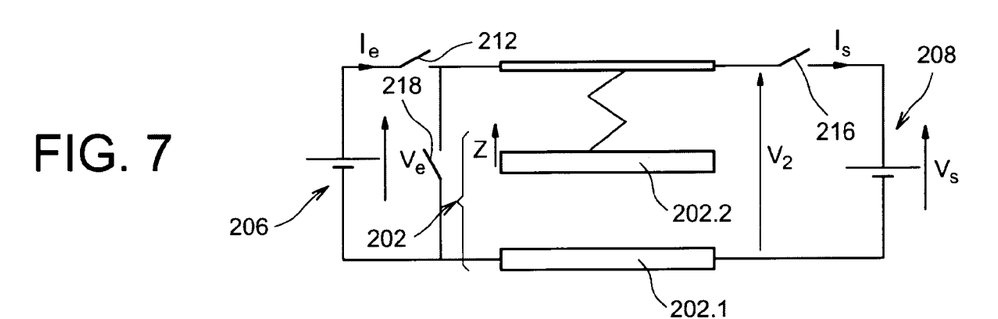
FIG. 7 is a schematic representation of a third embodiment of a conversion system according to the invention, the system comprising a single variable capacitor.
Figures 7A, 7B:
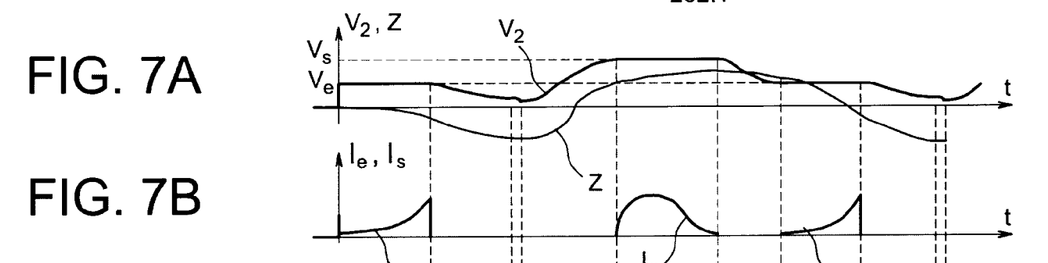
FIGS. 7A to 7C are graphic representations of different characteristics of the system in FIG. 7, FIG. 7D showing a chronogram indicating the different states of the switches in FIG. 7.
Figure 7C:
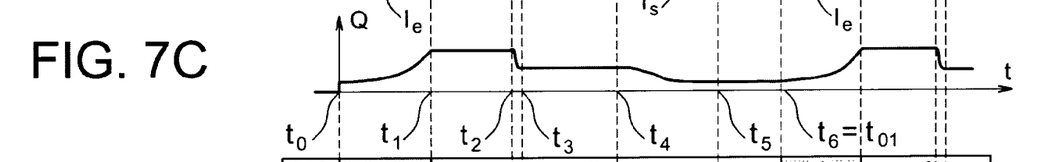
Figure 7D:
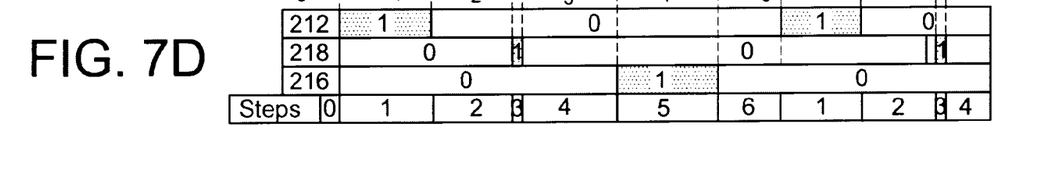

In the chronograms shown in FIGS. 3, 6 and 7D, the number 0 indicates an open state of the switch and 1 indicates a closed state of the switch.

Figure 1:
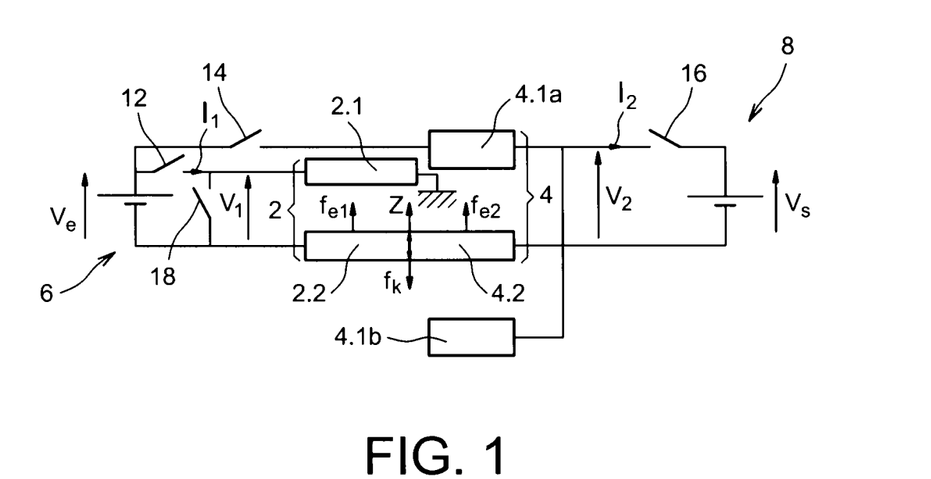
FIG. 1 is a schematic representation of a first embodiment of a conversion system according to the invention.

FIG. 1 shows a schematic representation of a conversion system according to a first embodiment comprising a first variable capacitor 2 and a second variable capacitor 4, an electrical energy source 6 at a given potential $V_e$ and an electrical energy collection system 8 at a given potential $V_S$, shown in the form of a battery. In the remainder of the description, we will denote the collection system 8 as a battery.

The first capacitor comprises a fixed plate 2.1 and a mobile plate 2.2 forming a capacitor with variable air gap; the second capacitor 4 comprises a fixed plate 4.1 and a mobile plate 4.2 also forming a capacitor with a variable air gap.

In the example shown, the second capacitor 4 comprises two fixed plates 4.1a and 4.1b arranged on each side of the mobile plate 4.2.

The mobile plates 2.2, 4.2 of the two capacitors are fixed to each other in displacement, and specifically moving the mobile plate 2.2 towards the fixed plate 2.1 of the first capacitor causes a movement of the mobile plate 4.2 towards the fixed plate 4.1a of the second capacitor 4 and a movement of the fixed plate 4.1b away from the second capacitor 4, and moving the mobile plate 2.2 away from the fixed plate 2.1 of the first capacitor causes a movement of the mobile plate 4.2 away from the plate 4.1a of the second capacitor and a movement of the fixed plate 4.1b towards the second capacitor 4.

In the example shown, the mobile plates 2.2 and 4.2 are coincident. In the remainder of this description, we will only use the reference 2.2 to refer to the mobile plate common to the two capacitors 2, 4.

It would also be possible to have a second capacitor 4 with a single fixed plate.

As we will see in the remainder of the description, electrostatic forces may arise between the fixed plates 2.1, 4.1a and 4.1b and the mobile plate 2.2, causing a displacement of the mobile plate; therefore elastic return means (not shown) are provided acting on the mobile plate. These return means form temporary means of storage of electrical energy in the form of mechanical energy. For example, the return means are composed of a beam that can deform orthogonal to its axis or one or several springs.

The advantage of the deformable beam is that it can easily be made by microelectronic processes, for example in the case of silicon integrated systems.

The energy source 6 is connected between the mobile plate 2.2 and the fixed plate 2.1, a switch 12 being provided between the source 6 and the fixed plate 2.1 forming a charge switch for the first capacitor 2. The energy source 6 is also connected in parallel to the fixed plates 4.1a and 4.1b, a switch 14 being provided between the source 6 and the fixed plates 4.1a and 4.1b. The switch 14 forms a charge switch for the second capacitor 4.

Furthermore, the collection system 8 is connected to the mobile plate 2.2 and to the fixed plates 4.1a, and 4.1b, a transfer switch 16 being provided between the battery 8 and the fixed plate 4.1.

The fixed plate 2.1 is also connected to the mobile plate 2.2 through a switch 18 forming a discharge switch for the first capacitor.

The voltage at the terminals of the first capacitor 2 is denoted $V_1$, the voltage at the terminals of the second capacitor 4 is denoted $V_2$, the electrostatic force exerted by the fixed plate 2.1 on the mobile plate 2.2 is denoted $f_{e1}$, the electrostatic force applied by the fixed plate 4.1 on the mobile plate 2.2 is denoted $f_{e2}$, and the force exerted by the elastic return means is denoted $f_k$.

The position of the mobile plate 2.2 is marked along a Z axis and is denoted z; in this example, z is equal to zero when the mobile electrode 4.2 (or 2.2) is at an equal distance from the two fixed electrodes 4.1a and 4.1b, the spring being at the rest state.

We will now describe operation of this system to convert electrical energy at a potential $V_e$ to a potential $V_S$ higher than $V_e$, with reference to the graphic representations of variations of the different characteristics of the conversion system in FIGS. 2A to 2D.

In the initial state, switches 12, 14, 16 and 18 are open and the first and second capacitors are discharged. At time $t_0$, switches 12 and 14 are closed. As soon as these switches close, fixed plates 2.1 and 4.1a and 4.1b, and the mobile plate 2.2, are charged, the capacitors 2 and 4 are electrically connected, and voltages $V_1$ and $V_2$ are both equal to $V_e$. A current I1 circulates through the switch 12. Therefore electrostatic forces $f_{e1}$ and $f_{e2}$ arise between the fixed plate 2.1 and the mobile plate 2.2 and between the fixed plates 4.1a, 4.1b and the mobile plate 2.2 respectively. $f_{e2}$ is the resultant of electrostatic forces exerted by the fixed plates 4.1a and 4.1b on the mobile plate 2.2, $f_{e2}$ being minimum when the mobile plate 2.2 is in its rest position. The plates 4.1a et 4.1b are chosen such that the resultant $f_{e2}$ attracts the mobile plate 2.2 towards the plate 4.1a when the mobile plate has begun to move towards plate 4.1a (z positive), initialisation of the movement of the mobile plate, upwards in this example, being the result of the applied electrostatic force $f_{e1}$.

Figure 2A:
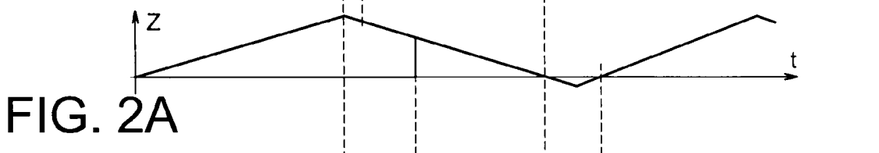
FIGS. 2A to 2D are graphic representations of different characteristics of the system in FIG. 1.

Since the sum of the electrostatic forces $f_{e1}$, $f_{e2}$ is greater than the sum of the mechanical force $f_k$, the mobile plate 2.2 moves towards the fixed plates 2.1, 4.1a, z increases as can be seen in FIG. 2A. Therefore, energy is stored in mechanical form (kinetic and potential energy).

Figure 2B:
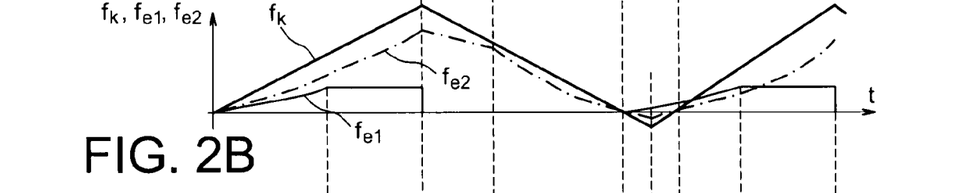
Figure 2C:
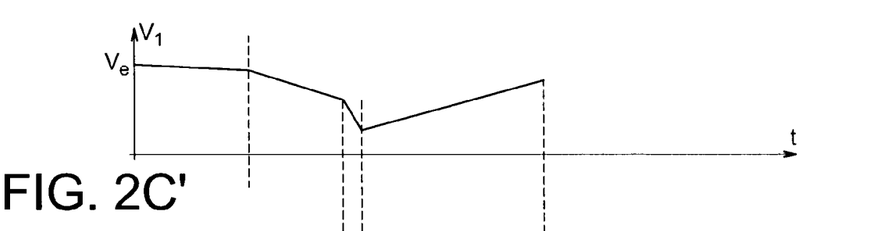

Electrostatic forces $f_{e1}$, $f_{e2}$ and the mechanical force $f_k$ increase as shown in FIG. 2B because the plates 2.1, 4.1a and 2.2 move towards each other.

The switch 12 remains closed until time t1. The electrical energy drawn from the source 6 is stored in the form of a mechanical potential energy in the elastic means by deformation of the elastic means, but also in kinetic form due to displacement of the electrode since the electrode has a non-zero speed. The quantity of energy stored is higher when the duration $t_1 - t_0$ is longer.

Note that when a capacitance that was initially completely discharged is charged, starting from a voltage source by closing a switch, the energy lost corresponds to the energy transferred to the capacitor, namely $\frac{1}{2} C \times V_e^2$ dissipated in the switch at the time that it is closed and $\frac{1}{2} C \times V_e^2$ effectively transferred to the capacitor to be charged, while the energy consumed in the source at $V_e$ is equal to $C \times V_e^2$. Therefore, it is preferable that the capacitance of the capacitor should be minimal when the switch 12 is closed at time $t_0$. Consequently, the percentage of energy lost relative to the energy transferred during this phase between t0 and $t_1$, is lower when the ratio of the capacitance C1 of the first capacitor 2 between the time of opening of switch 12 and closing of switch 12 is high.

Figure 2D:
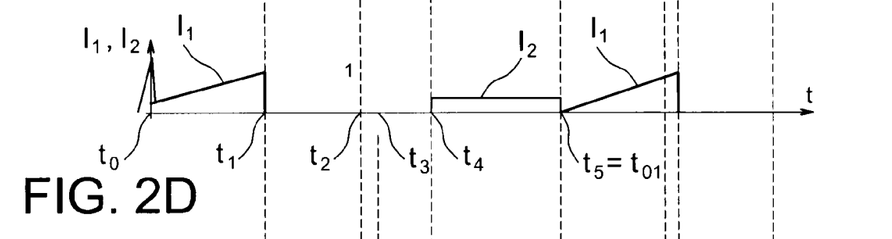

According to the invention, in a next step at time $t_1$, switch 12 is opened and switch 18 is kept open, and current $I_1$ becomes zero as can be seen in FIG. 2D. The system then operates at constant charge, the electrostatic force $f_{e1}$ stops increasing. This is shown by a plateau in FIG. 2B. The plate 2.2 continues its movement and moves towards the fixed plates 2.1 and 4.1a. The electrical potential and the associated electrical energy decrease as the capacitance of the capacitor 2 increases (due to the plates 2.2 and 2.1 moving towards each other). The electrical energy stored in capacitor 2 at time t1 is progressively transformed into mechanical energy which is stored in the elastic return means.

At time $t_2$, when the mobile plate is very close to the fixed plates, i.e. when z reaches a maximum value, switch 14 is open, switch 12 remains open and switch 18 is temporarily closed so as to evacuate charges from the fixed plate 2.1 of the first capacitor 2, the electrostatic force $f_{e1}$ becomes zero.

As explained above, note that the energy dissipated when switch 18 closes decreases as the variation in the capacitance of capacitor 2 between the time of opening of switch 12 at time t1 and the time of closing of switch 18 at time t2 increases. This constant charge phase between times t1 and t2 reduces the electrical energy stored in the capacitor that would be lost when the switch 18 is closed.

According to one variant of the operation described above, the capacitor 2 is partially discharged during times $t_2$ and $t_3$. The variation in voltage V1 in the case of a partial discharge can be seen in FIG. 2C'. It can be seen that as the mobile plate moves towards its equilibrium position as described below, there is a partial discharge level of the capacitor 2 such that the voltage V1 is approximately equal to Ve at the end of the cycle or more precisely at the start time t01 of the next cycle. This provides a judicious means of firstly limiting energy losses for the cycle considered and secondly eliminating the energy loss related to closing of the switch 12 at the start of the next cycle at time t01.

The capacitor 2 must discharge sufficiently so that the return force $f_k$ at time t3 after the switch 18 reopens is greater than the sum of the electrostatic forces. The return force $f_k$ exerted by the return means then moves the mobile plate 2.2 to its initial position and away from the fixed electrodes 2.1 and 4.1.a.

Advantageously, it would be possible for the switch 18 to be closed when the plates 2.1 and 2.2 are at the contact limit.

A safety distance may be provided between the mobile plate and the fixed plates to prevent any damage. However, it would be possible for the mobile plate to come into contact with an electrically conducting stop so that the stored charges can be automatically removed without the use of an additional switch for which actuation must be controlled. This contact with the stop occurs such that it does not dissipate mechanical energy from the mobile plate 2.2, and does not damage the system.

Due to its return into its equilibrium position and therefore its movement away from the fixed plate 4.1.a, the mobile plate 2.2 increases the electrical potential at the terminals of the second capacitor 4. As the mobile plate 4.2 returns to its equilibrium position, the capacitance C2 of the second capacitor reduces. The fixed plate 4.1 is electrically isolated from the rest of the circuit by the switch 14 opening (switch 16 also being kept open) and its charge Q2 does not change, therefore we obtain:

$$V_2 = \frac{Q_2}{C_2}, \quad (I)$$

therefore a reduction of $C_2$ increases $V_2$ at constant charge $Q_2$.

Therefore, in principle this phase is lossless.

In a next step at time $t_4$, the energy stored in mechanical form during the deformation phase of the elastic return means, is restored to battery 8 at a potential V. To achieve this, the switch closes when the potential $V_2$ reaches the potential Vs. The potential $V_2$ is then limited and the charges are transferred from the fixed plate 4.1 to the battery 8. In principle this phase is also lossless, because the voltage at the terminals of the switch 16 is zero when it closes (potential $V_S$ at the two terminals).

Charges were transferred from an input potential $V_e$ to an output potential $V_s$ during the phases described above. In fact, the second capacitor 4 acts as a charge carrier and the first capacitor 2 provides the additional energy necessary to change these charges from potential $V_e$ to potential $V_s$.

The mobile plate 2.2 is not in the initial position at time t5 at the end of a cycle, as can be seen in FIG. 2A, due to the residual kinetic energy.

The steps to convert electrical energy at potential $V_e$ to electrical energy at potential $V_S$ make up one conversion cycle. The converter according to this invention can operate either in continuous mode or in transient mode, unlike converters according to the state of the art that can only operate in continuous mode around a resonant frequency. With the invention, energy can be transferred quickly and at any time with low energy losses.

Furthermore, the discharge of the capacitor between times t2 and t3 takes place very quickly, in less than $\frac{1}{100}^{th}$ of the period of mechanical movement between the initial position and when it returns to the initial position between t0 and t5.

With the invention, cycles can be performed continuously, with cycles chaining one after the other (operating at mechanical resonance of the mobile element and not at the mechanical resonance) or arbitrarily in time (asynchronous transfers) depending on applications, an indeterminate time elapsing between each cycle.

Note that with this invention, a judicious control of switches is preferably chosen compatible with relaxation times of mechanical components to return the mobile element. Unlike devices according to prior art, judicious control of this type enables a system according to the invention to operate outside its mechanical resonant frequency.

Continuous operation has the advantage of reducing electrical losses. As explained above, electrical energy is consumed and lost while a fully discharged capacitor is being charged, and is materialised by a current peak for $I_1$ at the beginning of cycle (t0), as can be seen in FIG. 2D. However, when a new cycle starts without interruption at time $t_{01}$ just after the first cycle and if the first capacitor 2 is deliberately not completely discharged when the switch 18 is closed, there is no need to charge the capacitor 2 when the switch 12 is closed. There is then no dissipation current peak, as can be seen in FIG. 2D. Therefore, there are no electrical losses during the second cycle. Consequently, subsequent cycles take place without any electrical loss due to this pre-charge phenomenon on the two sides of the switch 12, and all that remain are losses associated with the partial or total discharge of capacitor 2.

The first capacitor can be partially discharged using a transistor with a calibrated time or using a transistor associated with a resistance and forming an RC circuit with capacitor 2.

Conversely, in the case of asynchronous operation, the loss at the beginning of the cycle is present every time because the first capacitor has to be recharged.

The use of two fixed electrodes 4.1a and 4.1b in the first embodiment in FIG. 1 has the advantage of improving controllability of the conversion device.

The electrostatic force $f_{e2}$ that is the resultant of electrostatic forces exerted by the two fixed plates 4.1a and 4.1b onto the mobile plate 4.2 is directly proportional to the position z of the mobile plate 4.2 when the electrical charge is kept constant on C2 (switches 14 and 16 open).

On the other hand, the electrostatic force $f_{e1}$ that is the electrostatic force between the fixed plate 2.1 and the mobile plate 2.2 is constant at constant charge, which is the case after total or partial discharge of the capacitor 2. If the discharge is not complete, there is a residual electrostatic force $f_{e1res}$ that can be considered as being negligible compared with $f_{e2}$.

We can therefore write:
$f_{e2} = k_{fe2} z$
$f_k = k_r z$
where $k_{fe2}$ is a proportionality coefficient and kr is the stiffness constant of the elastic means.

Consequently, starting at time t3, the mobile plate 2.2 is acted upon by the return force of the elastic means and $f_{e2}$. By choosing $k_{fe2}$ to be less than $k_r$, it is certain that when fe1 is zero or almost zero, the resultant of forces applied to the mobile plate 2.2 will allow the mobile plate to move away from plate 4.1a to return to its equilibrium position.

Figure 4:
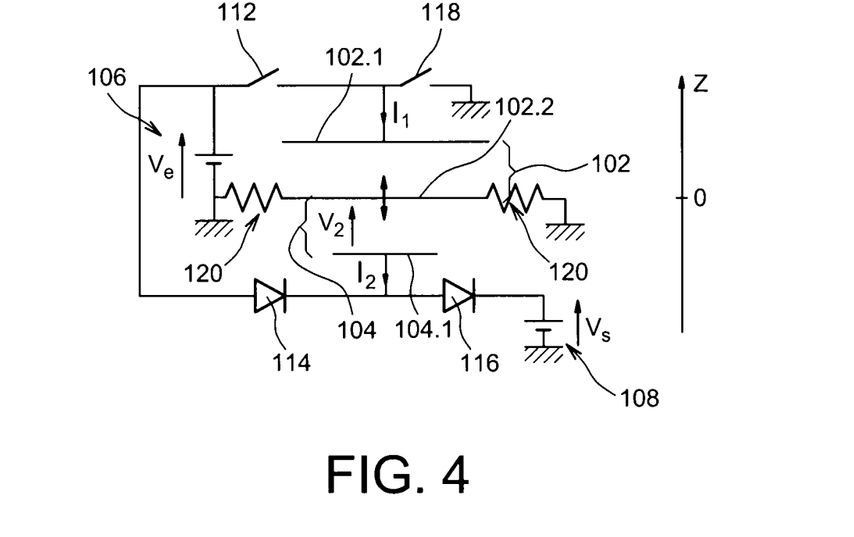
FIG. 4 is a schematic representation of a second embodiment of a conversion system according to the invention.

FIG. 4 shows a second embodiment of an electrical converter according to this invention in which the mobile plate is arranged between the fixed plates of the two variable capacitors.

The converter comprises a first capacitor 102 formed from a fixed plate 102.1 and a mobile plate 102.2 forming a capacitor with a variable air gap, a second capacitor 104 formed from a fixed plate 104.1 and the mobile plate 102.2 forming a variable air gap capacitor. The converter also comprises an energy source 6 at voltage $V_e$, a first terminal of which is connected to the ground and to the mobile plate 102.2, a second terminal being connected through a switch 112 to the fixed plate 102.1, and being connected through a diode 114 to the fixed plate 104.1. The converter also comprises an electrical energy collector 108 at voltage $V_S$ hereinafter called the battery. A diode 116 is arranged between the fixed plate 104.1 and the collector 108.

The fixed plate 102.1 is also connected to the ground through a switch 118.

The mobile plate 102.2 can move along a z axis orthogonal to the largest surface to move towards or away from the fixed plates 102.1, 104.1. Elastic means 120 connect the mobile plate to a frame (not shown) and can return the mobile plate into its equilibrium position. In the example shown, the elastic means are springs. The equilibrium position with zero z is the position of the mobile plate 102.2, without electrostatic forces being applied between the fixed plates 102.1, 104.1 and the mobile plate 102.2.

It is planned that the surface area of the fixed plate 102.1 facing the mobile plate 102.2 is larger than the surface area of the fixed plate 104.1 facing the mobile plate 102.2. Thus, the electrostatic attraction exerted by the plate 102.1 is stronger than the electrostatic attraction applied by plate 104.1 for the same applied electrical voltage when the mobile electrode 102.1 is close to its equilibrium position.

$V_1$ is the potential difference at the terminals of the first capacitor 102 and $V_2$ is the potential difference at the terminals of the second capacitor 104.

In the case of plates with equal surface areas, it is advantageous to have an asymmetric structure to trigger the movement, and this is done by shifting the equilibrium position, i.e. the mobile electrode 102.2 is placed closer to electrode 102.1 than electrode 104.1. The shift is such that the initial position when $V_2$ is equal to $V_e$, is for example the mid-position between electrodes 102.1 and 104.1. However, a symmetric structure is still within the scope of this invention.

We will now explain operation of the converter according to FIG. 4, with reference to the graphic views 5A to 5D and the time diagram showing the state of switch 112 in FIG. 6.

Figures 5A, 5B:
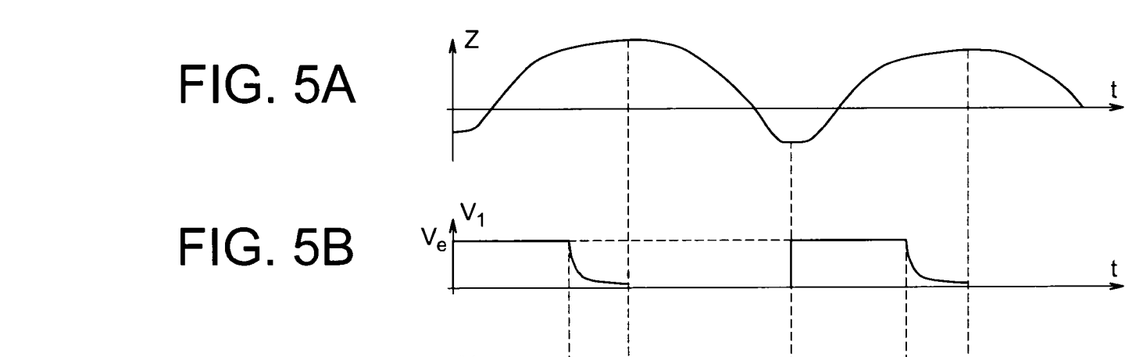
FIGS. 5A to 5D are graphic representations of the different characteristics of the system in FIG. 4.
Figure 5C:
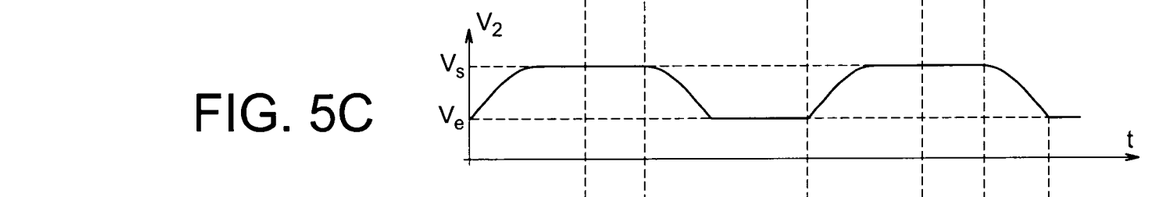

In the initial state, the switch 112 is open and only the fixed plate 104.1 of the second capacitor 104 is polarised at voltage $V_e$, $V2 = V_e$ through diode 114 (except for the diode voltage). Plate 104.1 carries electrical charges, consequently, an electrostatic force appears between the fixed plate 104.1 and the mobile plate 102.2. Consequently, the mobile plate 102.2 moves towards the fixed plate 104.1, therefore the z coordinate is negative as can be seen in FIG. 5A at t=0.

In a next step, switch 112 is closed, the plate 102.1 is then also at voltage $V_e$, and $V_1 = V_e$. An electrostatic force then also appears between the fixed plate 102.1 and the mobile plate 102.2. The surface area of the fixed plate 102.1 facing the mobile plate 102.2 is larger than the surface area of the plate 104.1, therefore the attraction exerted by the fixed plate 102.1 on the mobile plate 102.2 is greater than the attraction exerted by the fixed plate 104.1, the mobile plate 102.2 changes its displacement direction and then moves towards the fixed plate 102.1, by moving away from the fixed plate 104.1. This separation movement causes blocking of the diode 114 and an increase in the voltage $V_2$ at the terminals of the second capacitor 104 at constant charge, the diodes 114 and 116 being blocked, followed by conduction of diode 116 when the voltage $V_2$ at the terminals of the capacitor reaches the value $V_S$ (see FIG. 5C) and a transfer of charges from the fixed plate 104.1 of the second capacitor 104 to the battery 108, because the charge reduces when the capacitance reduces at constant voltage $V_S$.

In a next step, the switch 112 is once again opened. Due to its inertia, the mobile plate 102.2 continues its displacement towards the maximum position z. Since the switch 112 is open, the charge quantity stored in the capacitor 102 remains constant, and the voltage $V_1$ reduces as shown in FIG. 5B due to the increase in electrical capacity due to the plates 102.1 and 102.2 of capacitor 102 moving towards each other.

Therefore, the stored electrical energy reduces as the mechanical potential energy stored in the elastic return means 120 increases.

The switch 118 is closed when the mobile plate 102.2 is in the maximum z position, the fixed plate 102.1 is then at zero potential due to it being earthed.

The energy stored in the return springs 120 as the mobile plate 102.2 moves towards the fixed plate 102.1 is then restored in the form of kinetic energy and generates a displacement of the mobile plate 102.2 towards the fixed plate 104.1 until it reaches a negative z value. When the mobile plate 102.2 has reached its minimum z position, a new cycle begins, switch 112 is then closed and a conversion cycle like that described above can resume.

According to one variant embodiment of the converter shown in FIG. 4, the switch 18 may be replaced by means permitting partial discharge of the capacitor 102 like those described above with regard to the other embodiment. The capacitor 102 must be sufficiently discharged to enable inversion of the movement of the mobile plate 102.2. Such partial discharge can reduce losses in switch 112 during the next cycle. To achieve this, the electrode 102.2 must maintain a sufficient charge to enable it to reach voltage Ve at the time that the switch 112 is closed.

Figure 5D:
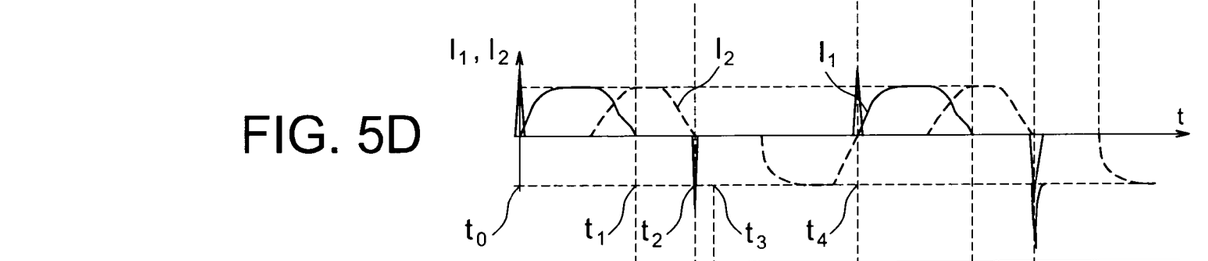

FIG. 5D shows the variation of the different currents in the system in FIG. 4.

In this embodiment, the potential energy stored in the springs can return the mobile plate 102.2 to its equilibrium position, and this energy will be converted into electrical energy during the next cycle.

This embodiment has the same advantage as the first embodiment in the case of continuous operation, i.e. there are fewer losses in the second cycle. The fact of performing a first cycle can position the mobile plate 102.2 in a position further away from the plate 102.1 (beyond its initial position). The capacitance between the electrode 102.2 and electrode 104.1 is then increased; a higher electrical charge ($Q=CV_2$) is transferred to the electrode 104.1 and then to the battery 108, and consequently a greater quantity of charge is transferred in each cycle.

In continuous mode, also called resonant mode, switch 112 can then be closed at a very low value of z, i.e. when the capacitance between electrode 102.1 and electrode 102.2 is very low; there are then fewer losses when switch 112 closes, and possibly no losses at all if a residual charge is left on the electrode 102.1, as was described with reference to the first embodiment.

FIG. 7 shows a third embodiment of an electrical conversion system according to this invention comprising a single variable capacitor for which the function varies with time.

The conversion system comprises a variable capacitor 202 formed from a fixed electrode 202.1 and a mobile electrode 202.2. An energy source 206 at a voltage $V_e$ is connected firstly to the mobile electrode 202.2 of the capacitor through a switch 212 called the charge switch, and secondly to the fixed electrode 202.1 of the capacitor. A switch 218 called the discharge switch is placed in parallel on the variable capacitor 202. An energy collector 208 at voltage $V_S$ is connected firstly to the mobile plate 202.2 of the capacitor 202 through a switch 216, and secondly to the fixed plate 202.1 of the capacitor.

Elastic return means 220 are also provided to return the mobile plate to its initial position, in the example shown these elastic means are shown diagrammatically in the form of a spring.

We will now explain operation of this system using graphic representations in FIGS. 7A to 7C corresponding to the time diagram in FIG. 7D.

Before time $t_0$, all switches are open and the electrostatic structure is completely discharged. Voltage V2 is zero.

At time $t_0$, switch 212 is closed, the variable capacitor 202 quickly charges to voltage Ve, the charge time is short compared with the period of the mechanical movement of the electrode 202.2. Since this charge is fast, a current peak $i_e$ appears. During this charge, half of the energy consumed at the source $V_e$ is transferred to the capacitance 202, the other half is dissipated into the switch 212. Advantageously, the switch 212 is closed at the moment at which the capacitance 202 is as low as possible because the dissipated energy is equal to $E=\frac{1}{2}CV_e^2$.

Due to the presence of a voltage at the terminals of capacitor 202, an electrostatic force appears between electrodes 202.1 and 202.2 between times $t_0$ and t1 (Step 1). This electrostatic force brings the two electrodes 202.1, 202.2 towards each other and increases the capacitance of the capacitor 202. The mechanical and electrical energies stored in the capacitor and the return means are then increased. The displacement of the electrode 202.2 increases the kinetic energy and the mechanical potential energy stored in the elastic elements (spring) and the increase in capacitance, called $C_{increased}$, increases the stored electrical energy because $E=\frac{1}{2}C_{increased}V_e^2$. This global increase in energy stored in the electrostatic structure originates from the source Ve and is practically lossless.

At time t1, switch 212 is open. The electrical charge stored on the capacitance 212 at this instant is denoted $Q_{t1}=C_{t1}V_e$.

During step 2, electrode 202.1 continues its movement at constant charge ($Q=Q_{t1}=C_{t1}V_e$). The voltage V2 at the terminals of the capacitor 202 decreases as the capacitance increases (V2=Qt1/Cincreased) and the corresponding electrical energy decreases accordingly ($E=\frac{1}{2}Qt1V$). In fact, the electrical energy stored on the capacitor 202 at time t1 is gradually transformed into mechanical energy (increase in the mechanical energy stored in the elastic elements).

At time t2, advantageously at the time at which the electrode 202.2 is at its closest to the electrode 202.1, in other words when the capacitance of the capacitor is maximum ($C_{max}$) and therefore the electrical energy stored in the capacitor 202 is at its lowest, and since $E=\frac{1}{2}Q_{t1}^2/C_{max}$, the switch 218 is closed for a short instant before the mechanical period at which the electrode 202.2 moves, thus discharging part of the electrical charge stored in the capacitance 202.

Switch 218 is open again at time t3, at the beginning of step 4. The reduction in electrical charge stored in capacitor 202 causes a new equilibrium of electrical and mechanical forces that is conducive to the electrode 202.2 returning and moving away from electrode 202.1. Since all switches are open, this return takes place at constant charge during step 4. Since the capacitance of capacitor 202 is reducing, the electrical voltage at its terminals increases because V=Q/C.

At time t4, and preferably at the moment at which the potential at the terminals of capacitor 202 reaches the output voltage $V_s$, switch 216 is closed. The switch 216 then closes at the moment at which the potential difference between these terminals is zero, and because the potential at the two terminals of the capacitor is equal to $V_s$, losses associated with this closure are then approximately zero. The electrode 202.2 continues to move away from electrode 202.1 at constant voltage (at $V_s$). Part of the electrical charge stored on electrode 202.2 is transferred to collector 208, and the charge on the capacitor 202 decreases.

Starting from time t5, switch 216 is preferably open at the moment at which the capacitance for the capacitor 202 reaches its minimum value, so as to maximise the electrical energy transferred to the output: $E_{transferred}=\frac{1}{2}(C_{t5}-C_{t4})V_s^2$.

The mobile electrode 202.2 moves towards the direction of electrode 202.1, the capacitance 202 then increases at constant electrical charge and the voltage at these terminals decreases, the voltage V2 decreases.

At time t6, switch 212 closes, preferably at the moment at which the voltage $V_2$ at the terminals of the capacitor 202 reaches $V_e$. The switch is then closed at the time at which the potential difference between these terminals is zero, the potential being equal to $V_e$ on each side. The losses associated with this closure are therefore approximately zero. Chaining of the cycles prevents losses associated with closure of switch 212. Losses occur at the start transition t0 because the capacitance 212 is initially completely discharged, which is no longer the case at $t_{01}$.

Figure 12:
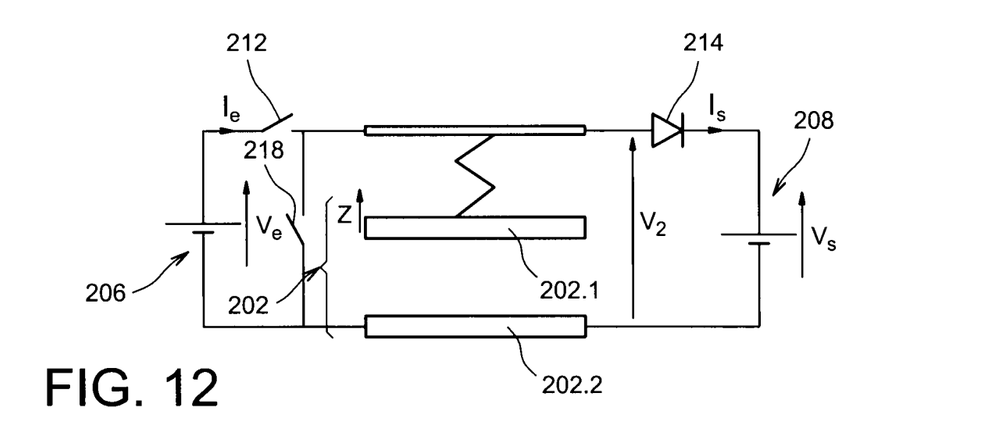
FIG. 12 shows a schematic representation of a variant embodiment of the conversion system in FIG. 7.

FIG. 12 shows a variant embodiment of the system in FIG. 7, in which the transfer switch 216 was replaced by a diode 214. This system operates in practically the same way as the system in FIG. 7. In the movement phase of the mobile electrode 202.1 corresponding to a reduction in the capacitance of capacitor 202, diode 214 becomes conducting enabling a transfer of charge towards the collector 208 when the voltage V2 becomes greater than the voltage Vs, except for the diode voltage.

For all embodiments, the switches may for example be controlled as a function of time, as a function of a capacitance or voltage measurement, or as a function of the zero derivative of the voltage. It would also be possible to use a position sensor to detect the positions of the mobile plate.

All embodiments of this invention described above may operate in voltage step up or step down. Means of detecting the voltage level in the output collection means, and a regulation device capable of retro-acting on the control of charge and discharge switches and other means could be provided. For example, the number of conversion cycles could be increased or reduced.

In the examples shown, the system comprises either two capacitors with at least one distinct electrode (first and second embodiments), or a single capacitor. It will be noted that each capacitor may be composed of several capacitors in parallel, for example in the form of capacitors of the inter-digitated comb type, well known in the field of conversion of vibration energy into electrical energy. In the case of the first embodiment, there is no need to provide one first capacitor 12 for each second capacitor, it would be quite possible to have one capacitor 2 to convert electrical energy into mechanical energy for several second capacitors that convert this energy into electrical energy at a potential different from the input potential.

Therefore, our invention can maintain high efficiency even in the case of very small systems and is thus suitable for very low power systems of the order of a nanoWatt and also for medium power systems of the order of one Watt.

Therefore, this invention is particularly applicable to all low power systems, for example portable electronic appliances such as mobile telephones or laptop computers.

This invention is particularly attractive for this type of appliance. These electronic appliances usually comprise several components operating at different power supply voltages. At the present time, cumbersome conversion systems have to be used for each component. With the invention, an integrated conversion system could be made for each voltage, which also produces very little or no heat due to the Joule effect. A single actuation capacitor could also be used to make conversions at several voltage levels particularly in the case of the first embodiment.

The system may be integrated into electronic appliances, without increasing their size, unlike existing conversion systems that are external to the appliances to which they supply energy (for example mobile telephone charger).

Figure 8A:
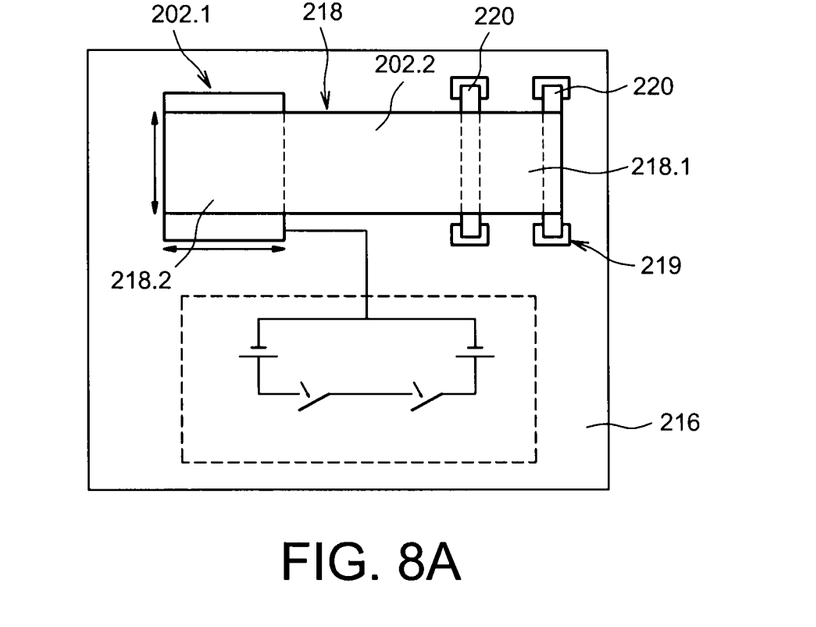
FIGS. 8A and 8B are top and side views respectively of a practical example embodiment of a conversion system according to the third embodiment.
Figure 8B:
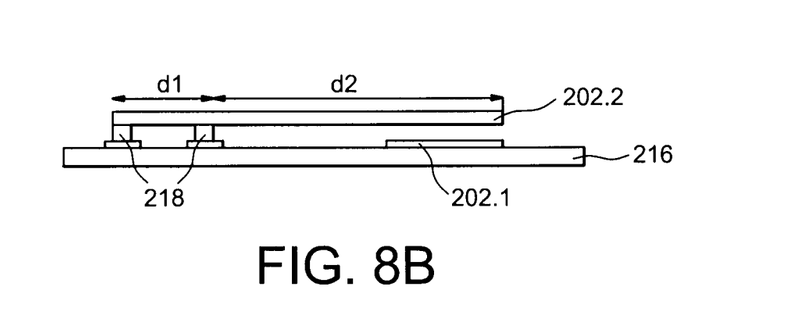

FIGS. 8A and 8B show an example of a practical embodiment of a conversion system according to the third embodiment.

The system comprises a support 216 of the printed circuit type on which the fixed electrode 202.1 is made, for example by metallisation.

The mobile electrode 202.2 is formed by a suspended end 218.2 of a mechanical beam 218 in the form of a metallic blade capable of deforming in bending and arranged facing the fixed electrode 202.1.

The beam 218 is fixed by a first longitudinal end 218.1 on two rows of spacers 220 fixed on the support 216, to space the mobile electrode from the fixed electrode with fairly good precision.

The zone 219 on which the spacers 220 are fixed has been metallised such that the potential of the beam 218 is accessible, since the spacers 220 are conducting and the printed circuit is isolating.

For example, the beam 218 may be made of stainless steel. The beam has a second longitudinal end 218.2 opposite the first longitudinal end 218.1 with a shape such that after deformation it becomes parallel to the fixed electrode 202.1 when it moves close towards it.

For example, the distance d1 separating the two spacers 220 is equal to 1 cm. The length d2 of the tip of the electrode is equal to 3 cm and the air gap between the fixed electrode 202.1 and the mobile electrode 202.2 is equal to 100 µm.

We will now calculate the Energy/Power ratio that this type of system can convert, as an example.

Consider the case of an input voltage Ve=24 V and an output voltage Vs=5 V.

We will consider that the switch 212 is closed during a time $t_1$ such that the mobile electrode 202.2 arrives 0.1 µm from the fixed electrode 202.1 at a potential of 5 V and that it then moves away to a distance of 15 µm, the switch 214 being closed, while the transferred energy $E_{transferred}$ at Vs will be equal to:

$$E_{transferred} = 1/2(C\max - C\min)Vs^2,$$

$$C_{max} = \frac{\varepsilon_0 S}{d_{min}} = \frac{\varepsilon_0 \times 1 \text{ cm}^2}{0.1 \text{ µm}} = 8.854 \text{ nF}$$

where $$C_{min} = \frac{\varepsilon_0 S}{d_{max}} = \frac{\varepsilon_0 \times 1 \text{ cm}^2}{15 \text{ µm}} = 59 \text{ pF}$$

hence $E_{transferred}$=110 nJ per cycle.

By choosing a beam thickness and material such as to make the beam resonant at 10 kHz, it is then possible to perform about 10000 cycles per second and therefore to transfer $10000 \times 110 \times 10^{-9}$=1.1 mW from the source $V_e$ to the output $V_s$.

Consequently, it is advantageous to have small air gaps so as to maximise the maximum capacitance $C_{max}$ and therefore the convertible energy per cycle (at $C_{max}/C_{min}=d_{max}/d_{min}$ kept high). This advantage is particularly useful if the structure is made using microelectronic processes.

It is also advantageous to have a high resonant frequency if it is required to convert a high electrical power.

It is also advantageous if the beam has a high quality factor to minimise mechanical losses.

Figure 9:
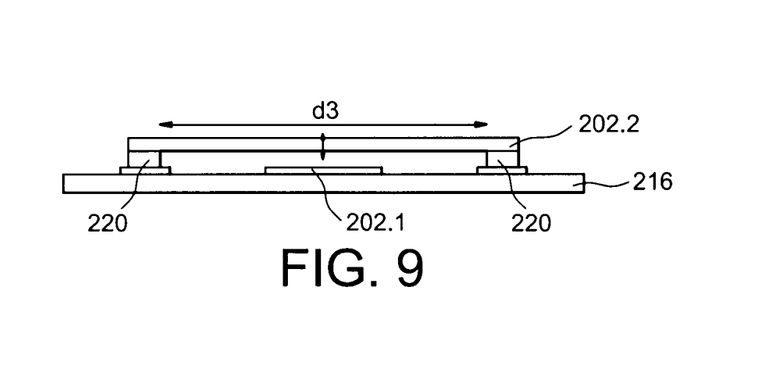
FIG. 9 is a side view of another practical embodiment of the conversion system according to the third embodiment.

FIG. 9 shows another example practical embodiment of the conversion system according to the third embodiment.

In this example, the beam 218 is suspended at each of its longitudinal ends 218.1, 218.1 by shims 220 that provide precise spacing of the mobile electrode from the fixed electrode. The beam is of the fixed-fixed blade type.

Therefore the mobile electrode 202.2 is formed by the central part of the beam and the fixed electrode 202.1 is formed on the support by metallisation.

As an example, the length d3 of the beam between the two shims is 6 cm. The distance between the mobile electrode and the fixed electrode at rest is 100 µm.

Figure 10:
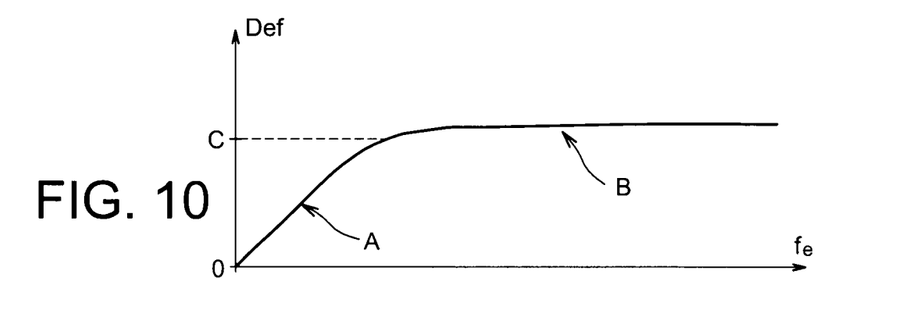
FIG. 10 shows the variation in deformation of a fixed-fixed beam as a function of the electrostatic force of the system in FIG. 9.

This system is very similar to the system shown in FIGS. 8A and 8B, the only difference is the beam deformation mode. In the case of low amplitude beam deformations relative to the beam thickness, the behaviour remains the same as the system shown in FIGS. 8A and 8B. When the deformation amplitude of the beam is large relative to the beam thickness, its behaviour is strongly non-linear, in other words the deformation at its centre (air gap variation) is no longer proportional to the applied electrostatic force, but its shape is as shown in FIG. 10. The curve in FIG. 10 shows the variation of the deformation Def as a function of the electrostatic force, and comprises a linear zone denoted A followed by a non-linear zone denoted B. The changeover from the linear zone to the non-linear zone symbolised by the dashed line C corresponds approximately to a deformation equal to the beam thickness.

In the case of small deformations, in other words deformations that are small compared with the thickness of the beam, the main mode is bending mode with deformation proportional to the applied force. On the other hand for large deformations, in other words greater than the beam thickness, the main mode is a tension mode (like a string), with a force that varies with the cube of the deformation.

This non-linearity can facilitate actuation of the mobile electrode. When the mobile electrode is far from the fixed electrode, the applicable electrostatic force is limited (the electrostatic force is proportional to the electrical field $E=V_e$/air gap). Consequently, the fact of having a fairly flexible beam when it is at a larger distance makes it possible to bring it closer, even if the electrostatic forces are limited. On the other hand, when the mobile electrode moves very close to the fixed electrode, the electrostatic force applied is much greater. In this case, the fact of having a beam that becomes stiffer does not hinder actuation, and makes it possible to store more energy in mechanical form for the same displacement.

It is then advantageous to choose an initial air gap slightly larger than the linear zone, in other words slightly larger than the beam thickness.

Figure 11:
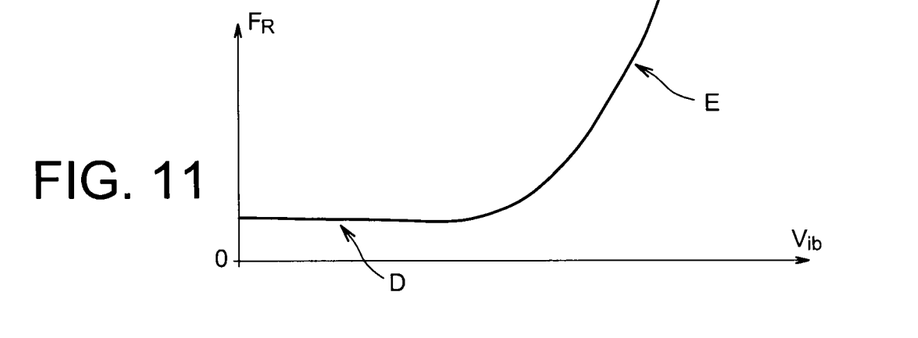
FIG. 11 shows the variation of the resonant frequency as a function of the vibration amplitude for a fixed-fixed beam in the system in FIG. 9.

The non-linearity of the beam also makes the resonant frequency dependent on the amplitude of the deformation as shown in FIG. 11. The curve in FIG. 11 shows the variation of the resonant frequency $F_R$ as a function of the vibration amplitude Vib, and it comprises a linear zone denoted D followed by a non-linear zone denoted E.

Due to its effect on the resonant frequency, the non-linearity can also regulate the power transfer. By acting on the switch control, the deformation amplitude of the beam can be modified and therefore the resonant frequency and consequently the charge transfer frequency and also the electrical power transmitted from the source $V_e$ to the output $V_s$ can be varied. All that is necessary to modify the deformation amplitude is for example to vary the quantity of energy input into the beam by varying the closing time of switch 212.

The fact that the resonant frequency can be adjusted firstly makes it possible to adjust the converted electrical power while remaining in continuous mode (and therefore in a low loss mode), and secondly to limit the number of switchings of the switches and therefore low associated losses when the power to be transmitted is low, which helps to maintain good efficiency even at low converted power (approximately constant transmitted power/losses ratio).

Those skilled in the art could imagine other embodiments of a conversion system according to this invention. For example, it would be possible to use other types of variable capacitors such as a capacitor with an electrode that can move laterally relative to another electrode by varying the facing surface between the two electrodes.

The invention claimed is:

1. A method for converting a first electrical energy at a first voltage into a second electrical energy at a second voltage by a conversion system including at least one voltage source at the first voltage connected to a variable capacitor through a charge switch, a discharge switch being placed in parallel with the variable capacitor, an energy collector at the second voltage, and a device of transferring energy between the variable capacitor and the energy collector, the variable capacitor including a fixed plate and a mobile plate capable of moving away from and towards the fixed plate and an elastic means to return the mobile plate to its initial position, the method comprising, for one complete conversion cycle:
 a) closing the charge switch, while the discharge switch remains open, to charge the variable capacitor at the first voltage, and inducing a displacement of the mobile plate increasing capacitance of the variable capacitor;
 b) subsequent to step a, opening the charge switch while keeping the discharge switch open to allow operation of the variable capacitor at constant charge, the capacitance of the variable capacitor continuing to increase;
 c) subsequent to step b, closing the discharge switch to allow at least partial discharge of the variable capacitor and to invert movement of the mobile plate,
 wherein the device of transferring energy provides energy transfer from the variable capacitor to the energy collector during movement of the mobile plate.

2. A conversion system from a first electrical energy at a first voltage to a second electrical energy at a second voltage comprising:
 at least one voltage source at the first voltage connected to a variable capacitor through a charge switch, a discharge switch being placed in parallel with the variable capacitor;
 an energy collector at the second voltage;
 a device transferring energy between the variable capacitor and the energy collector;
 the variable capacitor comprising a fixed plate, a mobile plate capable of moving away from and towards the fixed plate, and elastic means to return the mobile plate to its initial position;
 a controller of charge and discharge switches such that for a conversion cycle:
 a) during a first operation, the discharge switch is opened and the charge switch is closed to charge the variable capacitor at the first voltage, and the mobile plate is displaced increasing capacitance of the variable capacitor;
 b) during a second operation subsequent to the first operation, the charge switch is open and the discharge switch is kept open to allow operation of the capacitor at constant charge, the capacitance of the variable capacitor continuing to increase;
 c) during a third operation subsequent to the second operation, the discharge switch is closed allowing at least partial discharge of the variable capacitor leading to an inversion of the movement of the mobile plate
 wherein the device of transferring energy transferring energy from the capacitor to the energy collector during movement of the mobile plate.

3. A conversion system according to claim 2, in which the switches are controlled such that the charge switch is closed when the capacitance of the variable capacitor is minimum.

4. A conversion system according to claim 2, in which the switches are controlled such that the discharge switch is closed when the capacitance of the variable capacitor is maximum.

5. A conversion system according to claim 2, in which an electrode of the variable capacitor is connected to the energy collector through a transfer switch or diode.

6. A conversion system according to claim 5, in which the transfer switch or diode is conducting during a movement phase of the mobile plate of the variable capacitor corresponding to a reduction in its capacitance.

7. A conversion system according to claim 2, in which the variable capacitor forms a first capacitor, the system further comprising a second variable capacitor comprising at least a fixed plate and a mobile plate capable of moving away from the fixed plate, the mobile plates in the first and second variable capacitors being fixed in movement, the second variable capacitor being connected to the energy collector though a transfer switch or diode.

8. A conversion system according to claim 7, in which the second variable capacitor comprises two fixed plates arranged on each side of the mobile plate.

9. A conversion system according to claim 7, in which each variable capacitor comprises a fixed plate and each is arranged on one side of a common mobile plate.

10. A conversion system according to claim 9, in which the first fixed plate of the first variable capacitor provides a surface facing the mobile plate above the surface of the second fixed plate of the second variable capacitor.

11. A conversion system according to claim 2, in which closing duration of the discharge switch is less than one hundredth of a duration of the conversion cycle.

12. A conversion system according to claim 2, in which the discharge switch is formed of elements supported on the fixed plate and the mobile plate of the variable capacitor, the discharge taking place by bringing elements supported on the plates into contact with each other.

13. A conversion system according to claim 2, in which switches are controllable switches as a function of time, a value of a position of a mobile plate, capacitance of the variable capacitors, a voltage at terminals of the variable capacitor, or the derivative of the voltage at the terminals of the variable capacitor.

14. A conversion system according to claim 2, the system being an integrated system made of silicon.

15. A conversion system according to claim 2, in which the elastic means are chosen from springs, blades, and deformable beams.

16. An electrical energy conversion assembly comprising at least two conversion systems according to claim 2, the assembly capable of converting the first energy at the first voltage into plural second energies at plural second voltages.

17. An electrical energy conversion assembly according to claim 16, in which the systems have a common mobile electrode.

18. An electronic device comprising at least one electrical energy conversion system according to claim 2.

19. An electronic device comprising at least one conversion assembly according to claim 16.

* * * * *